May 17, 1927.

W. MAIER 1,629,113

FASTENING DEVICE

Filed Jan. 16, 1925

Inventor:
William Maier,
By Hugh L. Wagner
Attorney.

Patented May 17, 1927.

1,629,113

UNITED STATES PATENT OFFICE.

WILLIAM MAIER, OF ST. LOUIS, MISSOURI.

FASTENING DEVICE.

Application filed January 16, 1925. Serial No. 2,880.

This invention relates broadly to means for fastening together an embracing element and the element which it embraces. As examples of the divers types of devices to which this invention is applicable, there may be mentioned, for the purpose of illustration, but not for exhaustive enumeration, its usefulness in securing pulleys, gears or other rotative driving or driven means to their respective shafts; its adaptability to chucks and the like; and its functioning as an adjustable means for securing rims, shells, or drums to their respective centering wheels or spiders. The invention is especially useful in fastening rotary dies or forming or creasing rolls to their respective arbors, spindles, or shafts, and will be best understood and appreciated by describing it in connection therewith.

Such rolls have hitherto been commonly fastened to their shafts by means of set screws, which produced a bur on the shaft, rendering impossible a minute re-adjustment of the rolls on the shaft when desired, because the tip of the screw inevitably tends to reseat itself in the bur or seat originally produced during the initial setting. Accordingly, an object of the present invention is to provide a fastening device which may be seated universally in any desired position, enabling the roll to be set rotarily or longitudinally anywhere on the shaft with great precision, a feature much to be desired in die work where extreme accuracy is essential.

Moreover, often the entire peripheral surface of the rolls is required for forming or creasing purposes, and there is no place available thereon for the insertion of a fastening device, especially near the middle portion of the surface, where the device is most desired in order to clamp the roll with even pressure at both ends thereof. Accordingly, another purpose of the present invention is to provide a fastening device which may be inserted and manipulated from the end of the roll and which will transmit pressure against the shaft intermediately of the ends of the roll.

Another object is to provide a fastening device having component parts and which may be readily inserted or withdrawn as a complete unit from between the two elements it is adapted to fasten together.

Another object is to provide a device of such cross-section that it may be held without turning in a cylindrically walled groove or socket in one of the elements, the cylindrically walled groove being more easily formed than a groove of other cross-section, and the device also being more economically formed of cylindrical rods adapted to fit therein.

A further object is to provide clearance which insures that the embracing element engages the embraced element only at its end portions, the intermediate portion being engaged by the fastening device, thus preventing any rocking or tilting which might occur if the intermediate portion of the embracing element were in more intimate contact with the shaft than the end portions, a result which might be produced by dirt or the like accumulating on the intermediate portion and producing a high spot thereon.

The objects above set forth and advantages incident to the invention will be best understood and appreciated from the following description of the preferred embodiment of this invention.

In the accompanying drawings forming part of this specification, in which like numbers of reference denote like parts wherever they occur, Figure 1 is an end view of a pair of elements fastened together with the device of this invention;

Figure 1:
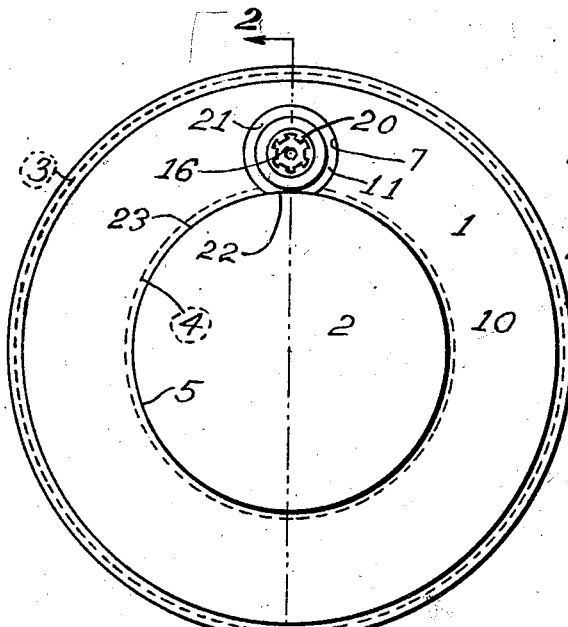
Figure 2:
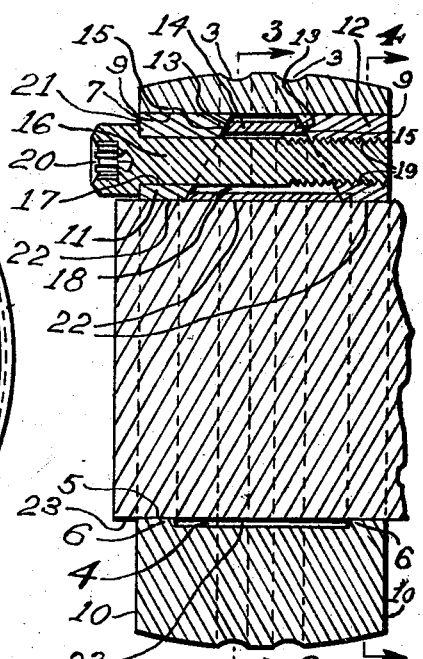
Figure 2 is a longitudinal sectional view taken on the line 2—2 in Figure 1.
Figure 3:
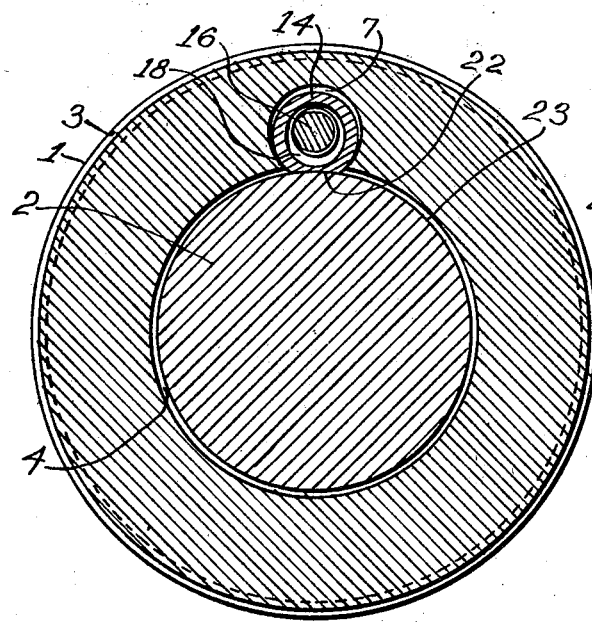
Figure 3 is a transverse sectional view taken on the line 3—3 in Figure 2.
Figure 4:
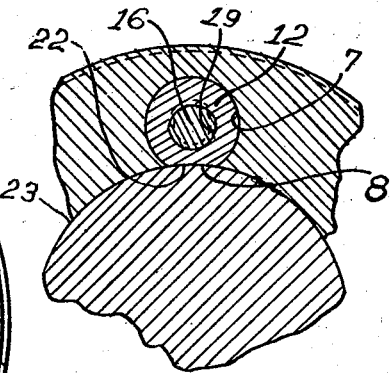
Figure 4 is a fragmentary transverse sectional view taken on the line 4—4 in Figure 2.

The creasing roll 1 embraces the shaft 2. The roll 1 bears peripheral channels 3, which co-operate with ridges or flanges on a co-acting roll (not shown) to produce creases in sheet material passed between the rollers. Roll 1 has an annular recess 4 in the middle portion of its internal cylindrical surface 5, so that only the end portions or flanges 6 of the surface 5 bear on the shaft 2.

A groove 7 is formed in the meeting surface of one of the elements, preferably in the surface 5 of the roll 2. The groove 7 is preferably cylindrical in cross-section, the continuity of its cylindrical wall being interrupted to form a preferably constricted mouth 8 at the surface 5. The groove 7 is preferably arranged parallel to the shaft 2, and its ends 9 open through the ends 10 of the roll 1.

A pair of blocks 11 and 12, respectively, fit slidably in the ends of the groove 7. The inner faces 13 of the said blocks are disposed obliquely with relation to one another, the faces 13 being closer together at the bottom of the groove 7. A shoe 14 is interposed between the blocks 11 and 12, the end faces 15 of the said shoe fitting the inner faces 13 of the blocks 11 and 12. A screw 16 passes in unthreaded relation through holes 17 and 18 in block 11 and shoe 14, respectively, and threads into tapped hole 19 in the other block 12, the head 20 of the screw bearing against the outer face 21 of the block 11. Blocks 11 and 12 and shoe 14 are preferably formed from cylindrical stock, a slice being taken from one side of the stock to form a retracted surface 22 to accommodate the cylindrical surface 23 of the shaft 2. Shoe 14 is of smaller external diameter and of larger internal diameter than the blocks 11 and 12, so that, when the blocks are screwed toward one another by turning the screw 16 in the proper direction, clearance is afforded the shoe 14 for the resulting transverse movement of the said shoe toward the shaft 2 by reason of the wedging action of the mutually approaching faces 13 on the shoe 14. The engagement of surfaces 22 with the shaft surface 23 prevents the blocks 11 and 12 and the shoe 14 from turning with the screw 16. Furthermore, the shoe 14 bears on the shaft 2 with a surface 22 of extended area instead of exerting pressure through a mere line of contact, as would occur if there were no special surface 22 provided on the shoe 14 to fit the cylindrical surface 23 of the shaft 2.

It will be observed that with this arrangement no burs can be formed on the shaft; the manipulation of the screw 16 does not disturb the preliminary setting of the roll 1 on the shaft 2 when it is desired to fasten the roll on the shaft after determining its correct position; the screw 16 is accessible from the end of the roll 1; and the shoe 14 bears on the middle portion of the embraced surface of the shaft 2, drawing the flanges 6 against the opposite side of the shaft 2, and securing the same in a stable fixed position, preventing any transverse rocking of the roll 1 on the shaft 2 because of high spots or foreign matter thereon.

Having thus fully described this invention, I hereby reserve the benefit of all changes in form, arrangement, order, or use of parts, as it is evident that many minor changes may be made therein without departing from the spirit of this invention or the scope of the following claims.

I claim:

1. The combination with a pair of elements disposed toward one another in embracing and embraced relation, respectively, and one of which is provided with a laterally-extending groove in its cooperating face and which groove opens into its lateral face, of a fastening device adapted to be inserted laterally into said groove, said device comprising a pair of blocks having their inner opposite surfaces inclined, a shoe abutting said blocks and presenting inclined abutting faces and means threadedly engaging one of said blocks for simultaneously urging the pair of blocks together for forcing said shoe into contact with one of said embraced elements.

2. Means for fastening together an embracing element and the element embraced thereby, comprising a pair of oppositely disposed blocks socketed in one of said elements, said blocks presenting oppositely directed inner inclined surfaces, a shoe substantially filling the space between said blocks and presenting inclined abutting surfaces thereto and screw means threadedly engaging one of said blocks and loosely engaging said shoe and adapted to contract said blocks and force said shoe into contact with said embraced element.

3. Means for fastening together an embracing element and the element embraced thereby, comprising a pair of oppositely disposed blocks socketed in one of the elements and having their opposing faces converging toward one another with their recession from the other element, screw means threading into one of the blocks and bearing against the other for drawing the said blocks toward one another, and a shoe wedged between the said blocks and adapted to bear on the said other element when the said blocks are drawn toward one another.

4. Means for fastening together an embracing element and the element embraced thereby, comprising a pair of oppositely disposed blocks socketed in one of the elements and having their opposing faces converging toward one another with their recession from the other element, a shoe wedged between the said blocks and adapted to bear on the other element when the said blocks are drawn towards one another, and screw means passing in unthreaded relation through the shoe and one of the said blocks and threading into the other block and adapted to clamp against the non-threading block.

5. In combination, an embracing element and an element embraced thereby, one of the said elements presenting an annular surface to the other and the other element having a pair of annular spaced-apart flanges which engage the annular surface of the first-mentioned element, a shoe adapted to bear against one of the elements intermediately of the said flanges, and means for exerting pressure between the said shoe and the other element.

6. In combination, an embracing element and an element embraced thereby, one of the said elements presenting an annular surface to the other and the other element having a pair of annular spaced-apart flanges which engage the annular surface of the first-mentioned element, a shoe adapted to be clamped against one of the elements intermediately of the said flanges, and means accessible laterally of an element for exerting pressure between the said shoe and its non-clamping element.

7. In combination, a pair of elements having mutually meeting external and internal cylindrical surfaces, respectively, one of the said surfaces having a cylindrically walled groove therein whose end opens through an end of the element bearing the said grooved surface; a pair of cylindrical blocks slidably fitting in the said grove at opposite ends thereof, each of the said blocks having its inner end faces in oblique relation to one another, the faces being closer together near the bottom of the groove; a cylindrical shoe of smaller cross-section than the groove and disposed therein intermediately of the said blocks and having end faces fitting the inner end faces of the said blocks; the shoe and the said blocks each having a part of its cylindrical surface retracted to fit the cylindrical surface of the other element; and a screw passing in unthreaded relation through the shoe and one of the said blocks and threading into the other block and having a head adapted to clamp against the non-threading block.

In testimony whereof I hereunto affix my signature.

WILLIAM MAIER.